April 21, 1953  L. MAZZOCCO  2,635,371
VIEWING DEVICE FOR POSITIVE PHOTOGRAPHIC PRINTS
Filed June 29, 1948  7 Sheets-Sheet 1
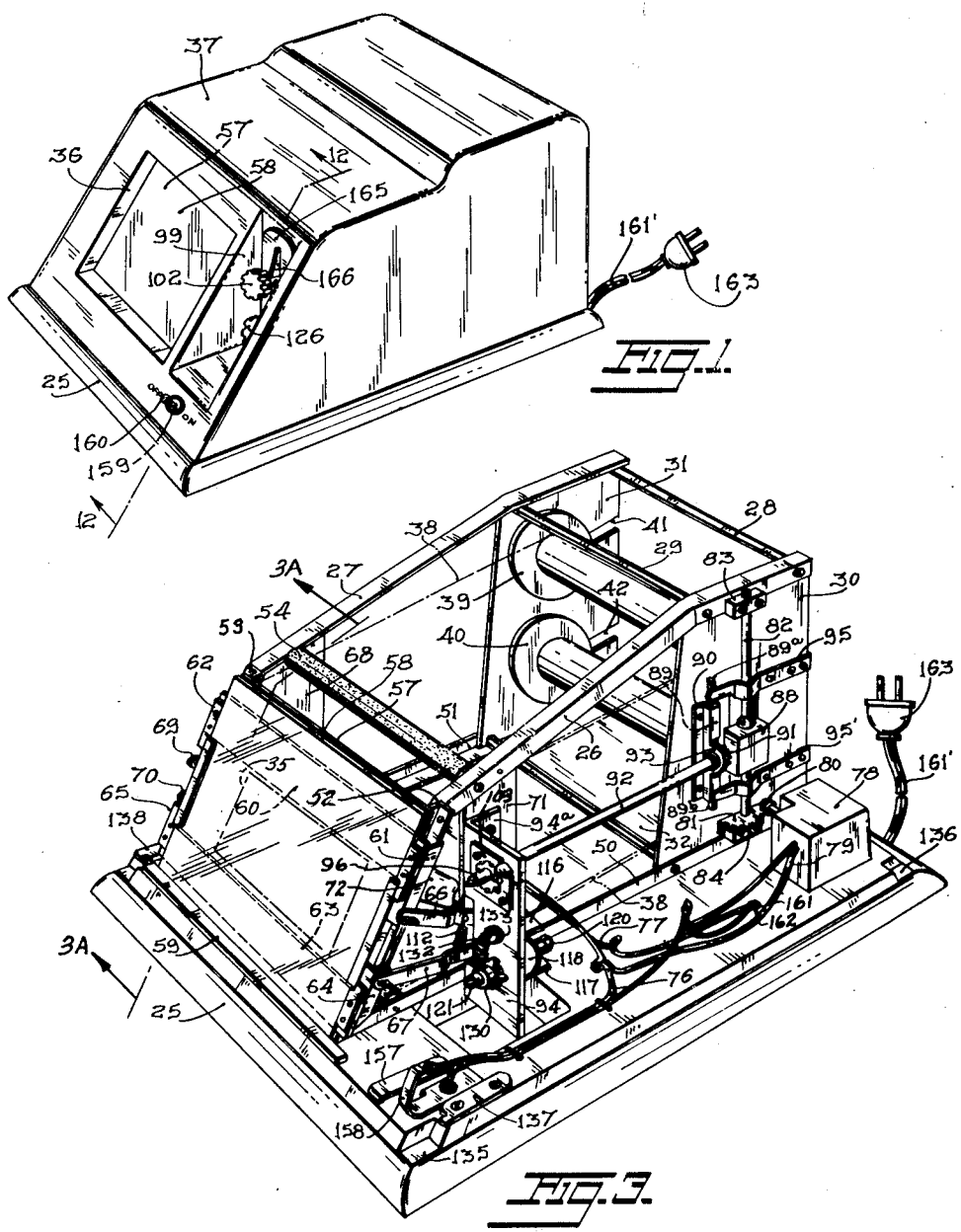
INVENTOR.
LEANDRO MAZZOCCO
BY
ATTORNEY April 21, 1953 L. MAZZOCCO 2,635,371
VIEWING DEVICE FOR POSITIVE PHOTOGRAPHIC PRINTS
Filed June 29, 1948 7 Sheets-Sheet 2
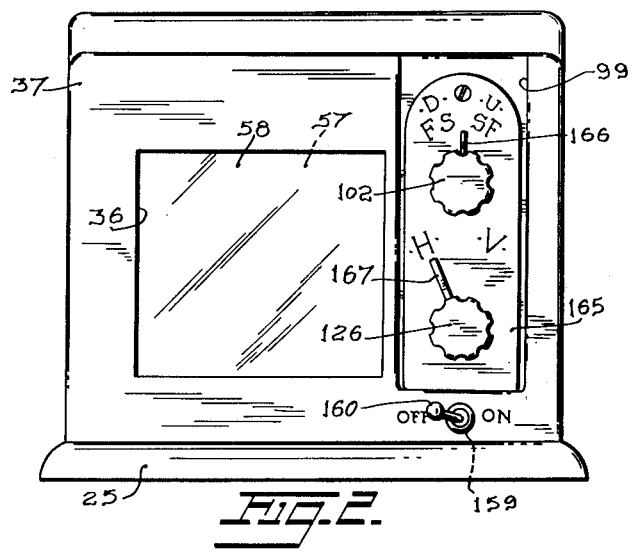
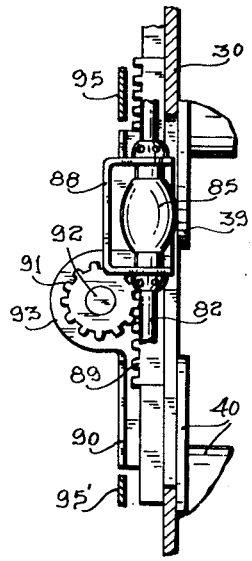
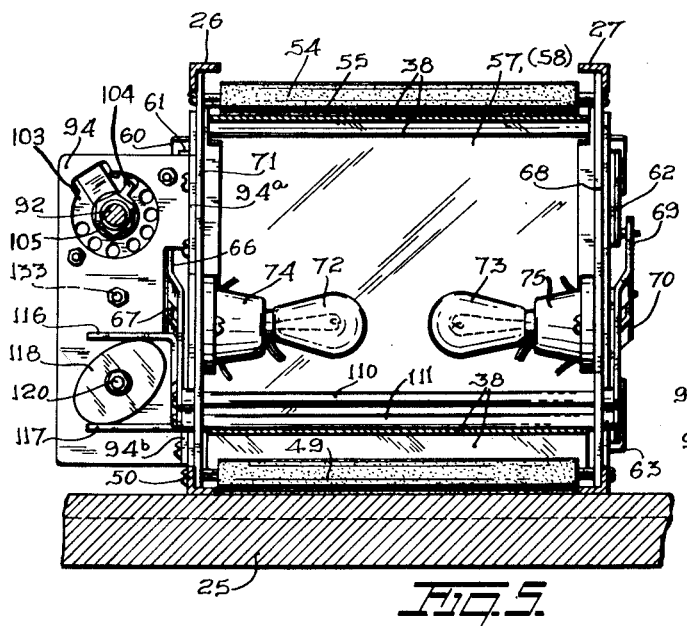
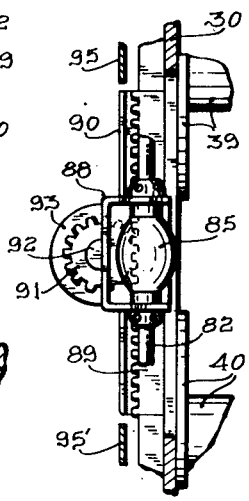
INVENTOR.
LEANDRO MAZZOCCO
BY
ATTORNEY

INVENTOR.
LEANDRO MAZZOCCO
BY
ATTORNEY

April 21, 1953    L. MAZZOCCO    2,635,371
VIEWING DEVICE FOR POSITIVE PHOTOGRAPHIC PRINTS
Filed June 29, 1948    7 Sheets-Sheet 4
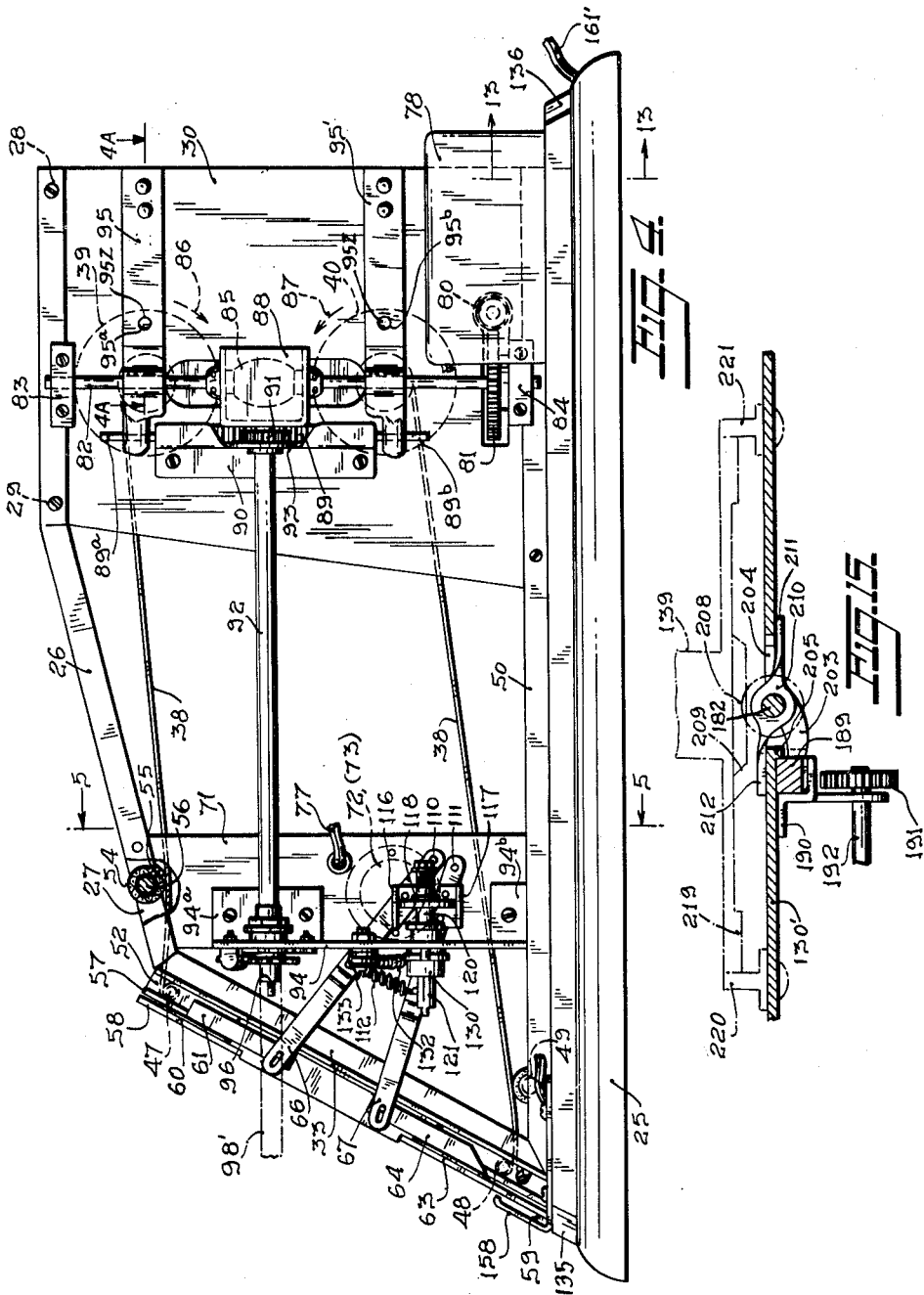
INVENTOR.
LEANDRO MAZZOCCO
BY
ATTORNEY April 21, 1953  L. MAZZOCCO  2,635,371
VIEWING DEVICE FOR POSITIVE PHOTOGRAPHIC PRINTS
Filed June 29, 1948  7 Sheets-Sheet 5
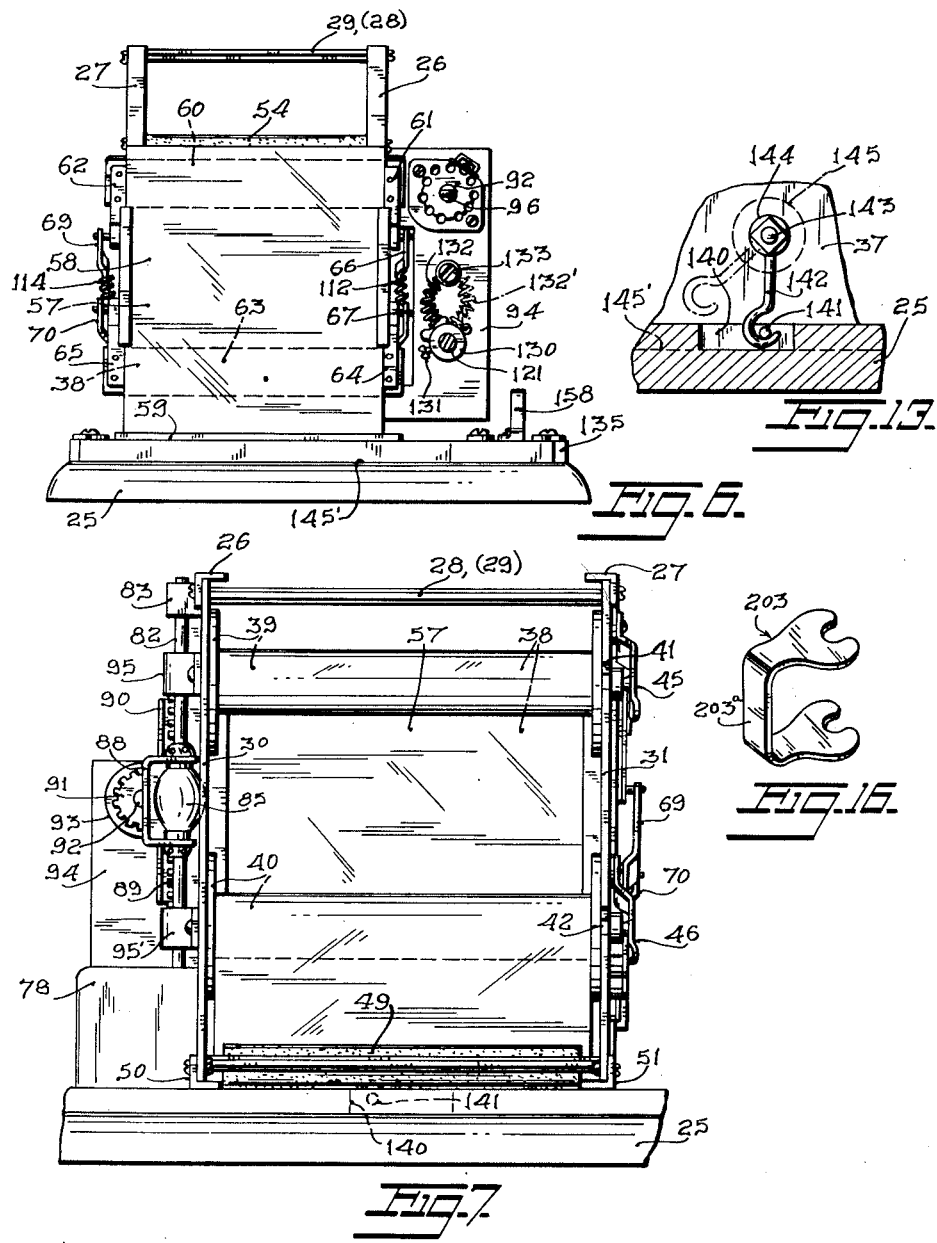
INVENTOR.
LEANDRO MAZZOCCO
BY
ATTORNEY April 21, 1953 L. MAZZOCCO 2,635,371
VIEWING DEVICE FOR POSITIVE PHOTOGRAPHIC PRINTS
Filed June 29, 1948 7 Sheets-Sheet 6
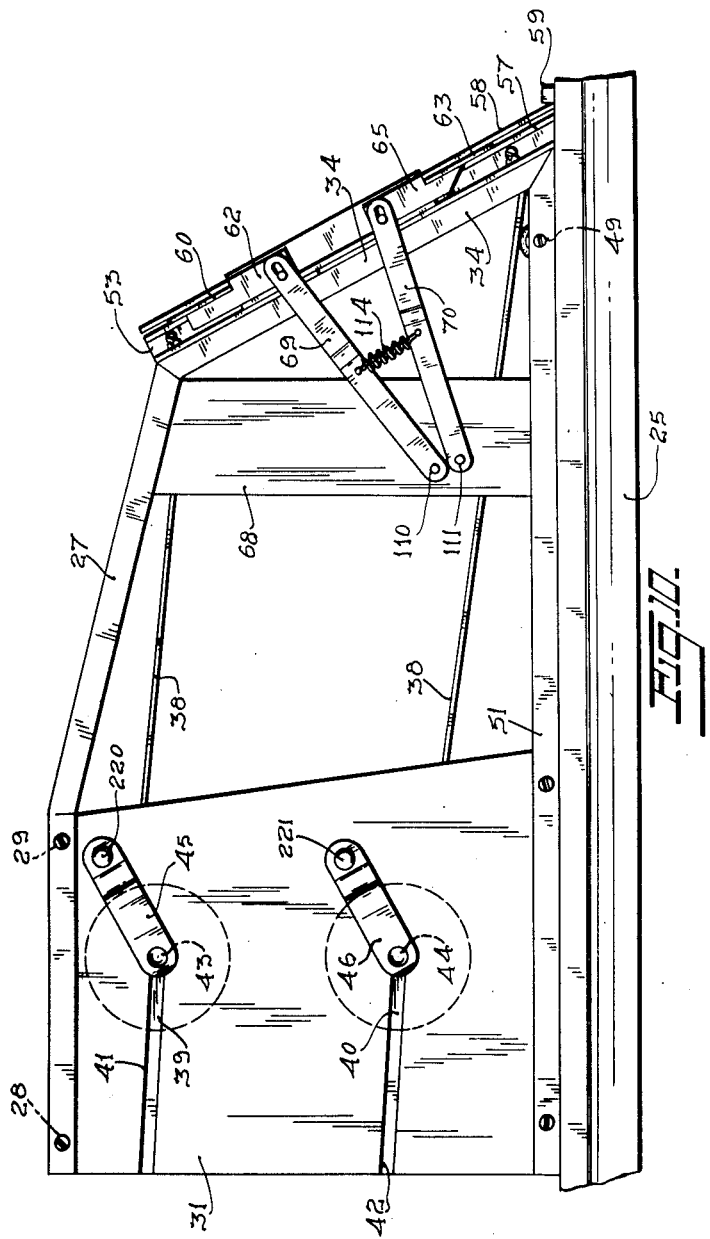
Fig.10.
INVENTOR.
LEANDRO MAZZOCCO
BY
ATTORNEY April 21, 1953   L. MAZZOCCO   2,635,371
VIEWING DEVICE FOR POSITIVE PHOTOGRAPHIC PRINTS
Filed June 29, 1948   7 Sheets-Sheet 7
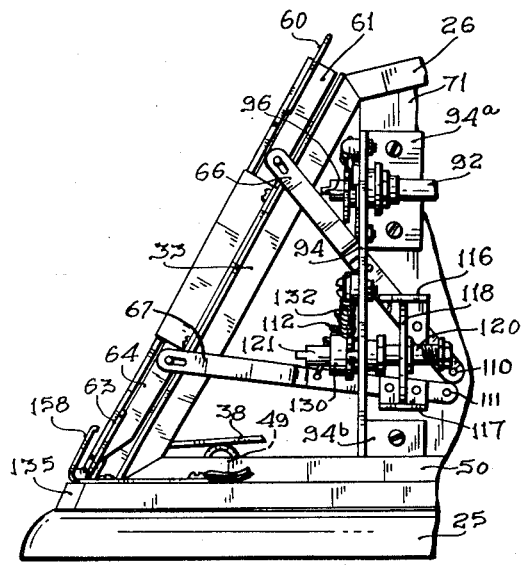
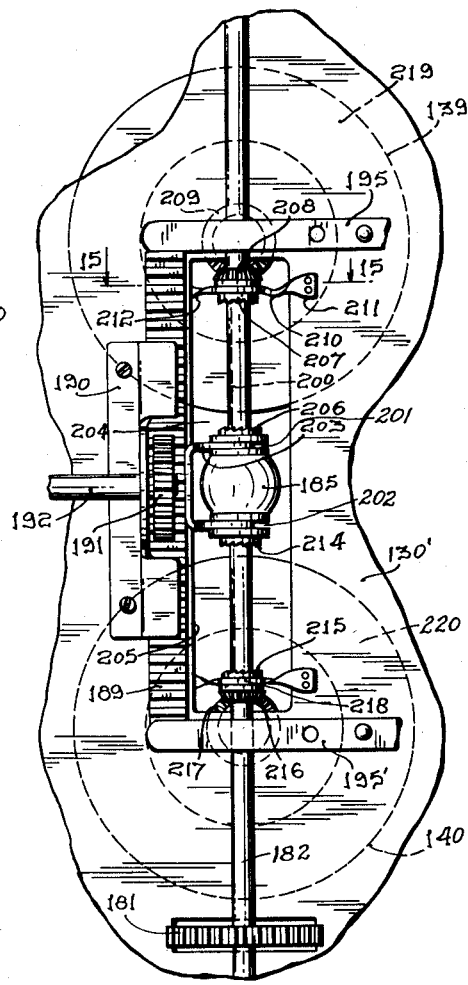
INVENTOR.
LEANDRO MAZZOCCO
BY
ATTORNEY Patented Apr. 21, 1953

2,635,371

UNITED STATES PATENT OFFICE 2,635,371

VIEWING DEVICE FOR POSITIVE
PHOTOGRAPHIC PRINTS

Leandro Mazzocco, New York, N. Y.

Application June 29, 1948, Serial No. 35,937

7 Claims. (Cl. 40—31)

The present invention, in one aspect thereof, provides a novel and valuable positive print viewing machine for the home, office or elsewhere, to be used in displaying photographs in substitution for the leaved albums in which carefully to be preserved positive photographic prints, black and white, or colored, are customarily kept for display; and, in another aspect of the invention, the same provides a new and improved type of positive photographic print of a kind such that said print when viewed by way of the machine is visually displayed with a clearness of detail not otherwise possible.

The new machine includes a view area, as at a window-like opening in a suitable casing, this area backed by a light-diffusing instrumentality, as a pane of milk-white glass, with an illuminating means behind said pane or the like for lighting up the picture.

Each of the photographs to be displayed at said area are photographically printed at a selected location on a belt form flexible transparent carrier, as one made as its motion picture film of cellulose acetate or the like, such carrier, of course, being coated with a photographic emulsion. The establishment on said carrier of a photographic positive is accomplished in a special way, that is, while there is use of a negative and said emulsion to photographically produce a positive on the carrier by the contact printing method, during such printing there is interposed between the negative and the carrier an exceedingly fine-mesh screen, such fineness preferably of the order of 300 lines to the square inch. The latter is a much finer mesh than used even for fine half-tone effects in printing-press work. Developing and fixing of the positives on the carrier may be effected in the usual manner.

When a positive on the film is arranged in front of a light diffusing instrumentality, with the film between the latter and the eyes of the observer, an extremely brilliant picture, whether the positive be black and white, or colored, is presented, with high lights and shadows sharply accentuated, and with a fidelity to detail which indeed is extraordinary. Where color photography is used, the colors are strikingly beautiful: where black and white photography is used, the high lights are pure white, and the shadows nevertheless are in marked contrast.

In the machine according to the invention, means are provided whereby the carrier may be moved endwisely in either direction relative to the viewing area, to dispose at said area any desired picture; such means including a pair of reels to the hubs of which are suitably connected the opposite ends of the carrier, and a manually controlled means for causing rotation of one of the reels to constitute the same as the take-up reel operating in one direction, to stop rotation of both reels, and to cause rotation of the other reel to constitute the same as the take-up reel operating in the opposite direction—whereby the carrier may be endwisely moved in either of two directions to advance a particular picture to the viewing area and there to halt said picture for as long as desired.

Also according to the invention, a manually controlled means is provided for modifying the viewing area in correspondence with the size or shape of a picture halted at the viewing area.

A further feature is that the reels are readily demountably journalled, to allow substitution in the machine of one carrier for another, and to allow the carrier to be extended in length, from time to time, as new positive photographic prints are made according to the invention. An additional carrier length can be attached at an end thereof to an end of the carrier as previously existing, by cementing the same together, as is common practice in making up the finally edited negative film for a motion picture.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of an embodiment of a machine according to the invention, as now favored.

Fig. 2 is a front elevation thereof.

Fig. 3 is an enlarged view similar to Fig. 1, but with the top cover removed.

Fig. 4 is a side elevation, also with the top cover removed.

Fig. 5 is a transverse vertical section, taken on the line 5—5 of Fig. 4.

Fig. 6 is a view similar to Fig. 2, but with the top cover removed.

Fig. 7 is a rear elevation, also with the cover removed.

Fig. 8 is a fragmentary elevational detail view, for showing more clearly a clutch-including means for transmitting a power drive to either reel to constitute the latter a take-up reel relative to the picture carrier; this means seen at the left in Fig. 7 and as viewed from the right in Fig. 4.

Fig. 9 is a similar view, but with the driving member of said clutch shifted to inoperative position.

Fig. 10 is an elevation showing the side of the machine opposite to that seen in Fig. 4.

Fig. 11 is a fragmentary side elevation, showing a redisposal of certain of the parts seen in Fig. 4.

Fig. 12 is a partial vertical sectional view taken substantially on the line 12—12 of Fig. 1.

Fig. 13 is a detail view in transverse vertical section, taken substantially on the line 13—13 of Fig. 4.

Fig. 14 is a fragmentary side elevational view, showing a modification of said clutch-including means.

Fig. 15 is a horizontal section, taken substantially on the line 15—15 of Fig. 14.

Fig. 16 is a perspective view of a part shown in Figs. 14 and 15.

Figure 3A:
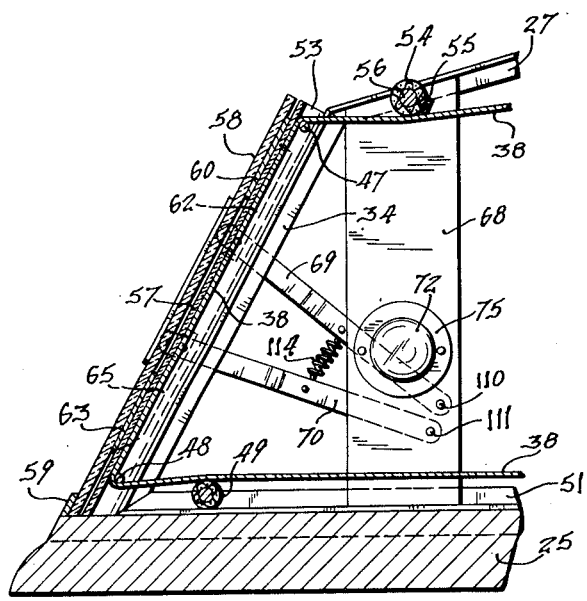
Fig. 3A is a partial vertical sectional view taken on the line 3A—3A of Fig. 3.

The viewing machine for positive prints, according to the first form of the invention shown in Figs. 1 to 13, includes a base 25 which rigidly carries two side-frames 26 and 27 joined at the rear of the machine by top tie-rods 28 and 29. Included in said frames at the rear of the machine are side plates 30 and 31, between the bottoms of which is a floor block 32.

At the front ends of the frames 26 and 27 they have forwardly downwardly inclined lengths (33, Fig. 4, and 34, Fig. 10), for providing at the front of the machine the aforesaid view area the maximum outline of which is indicated in Fig. 3 in dot and dash lines at 35, such outline matching that of a front opening 36 in a removable top cover 37.

The picture carrier 38 is a length of flexible transparent film secured at one end to the hub portion of an upper reel 39 and secured at its opposite end to the hub portion of a lower reel 40. These securements may be made in any suitable way, as by use of adhesive tape, slots through said hub portions, etc.

Beyond the end flange of each reel at the left in Fig. 7 is a pivot projection insertable into a shallow recess in the inner side of the plate 30. Each such recess is located directly opposite the inner end of a slot 41 or 42 (best shown in Fig. 10), one for serving each of said reels. A pivot projection aligned axially of the reel with that reel's first-named pivot projection is provided for each reel as indicated at 43 and 44, these, respectively, for entering into the slots 41 and 42. The outer sides of a reel's end flanges are a somewhat less distance apart than the spacing between the plates 30 and 31; so that, with a reel's pivot projection 43 or 44 first inserted all the way along the length of its slot 41 or 42, the reel may be shifted axially to enter its first-named pivot projection into the appointed one of said recesses in the plate 30; the reel being held with its two pivot projections thus disposed, by means of a spring clip 45 or 46 having a dimpled portion for snap engagement with a pivot projection 43 or 44.

The carrier 38 along its length extending between the two reels is guided over idler rollers 47, 48 and 49, see Fig. 4. The roller 49, preferably covered with felt or the like, is journalled at opposite ends in two bottom strips 50 and 51, see Figs. 4, 5 and 7. The rollers 47 and 48 are journalled at opposite ends in a pair of angle strips 52 and 53, see Figs. 1, 4 and 10, secured respectively to the frame lengths 33 and 34. The carrier 38 also passes under a dust-off wiper 54 in the form of a sleeve of felt, stitched longitudinally as indicated at 55 in Fig. 4, and mounted on a cross-rod 56 to have edge portions of said sleeve below such stitching engage the carrier 38 (note also Figs. 1 and 5).

The rollers 47 and 48 are, respectively, just above the top limit and just below the bottom limit of the view area or panel 35. Referring particularly to Figs. 3 and 10, at said panel is a milk-white glass pane 57. A little forward of said pane 57 is a clear transparent glass pane 58. These panes are held in place partially by their own weight, resting on the base 25, and with the pane 58 at its bottom just behind a cleat 59.

Between said panes 57 and 58 near the tops thereof there is a transversely extending thin shutter member 60, secured at its opposite ends to angle-pieces 61 and 62; and between said panes near their bottoms is a similar shutter member 63 secured at its opposite ends to angle-pieces 64 and 65. Each of said pieces 61 and 64 has a pin-and-slot connection, as shown in Fig. 3, with, respectively, a different one of two levers 66 and 67 (see also Fig. 4); and each of the pieces 62 and 65 has a similar connection, as shown in Fig. 10, with, respectively a different one of two levers 69 and 70.

Said shutters are parts of the aforesaid panel area modifying means, below to be described in further detail; but as will now be noted, the arrangement of the parts just above described is such as to maintain the panes 57 and 58 against lateral shift from the intended positions thereof at the view panel; the levers 66, 67, 69 and 70 being attached, adjacent to the outer sides of the side plates 30 and 31, in a way to prevent sidewise shift of said levers away from said plates, by means also later to be described.

For illuminating a selected picture on the carrier 38 when said picture is brought to the view panel 35, an illuminating means is provided which here is shown as comprising (Figs. 4 and 5) a pair of electric lamps 72 and 73, these carried in sockets 74 and 75 secured to the inner sides of a pair of front side plates 68 and 71; part of the wiring for the sockets being indicated at 76 and 77.

A very small, fractional horse-power electric motor 78 (Figs. 3, 4 and 7), a part of the wiring for which is indicated at 79, is secured to the base 25, and on its shaft is fixed a worm 80 meshing with a worm-gear 81 fixed on a vertical shaft 82 journalled in blocks 83 and 84. Splined on the shaft 82 is the driving member 85 (see also Figs. 8 and 9) of a clutch means for at will rotating the reel 39 as a take-up reel for the carrier 38 or rotating the reel 40 as a take-up reel for said carrier. The member 85 is round in horizontal cross-section, and preferably of fairly soft rubber, so that when, from its normal inoperative position as shown in Fig. 9, it is moved upward to engage as in Fig. 8 the outer side of the adjacent end flange of the reel 39 as the driven member of the clutch, said reel will be rotated in the direction of the arrow 86 of Fig. 4, and when, from said normal position, the member 85 is moved downward similarly to engage the reel 40, the latter reel will be rotated in the direction of the arrow 87 of Fig. 4.

For shifting the motor drive to either reel 39 and 40, and to disable such drive relative to both reels, a substantially cube-shaped cage 88 is provided, closed in at four sides as indicated in Figs. 4 and 7; such sides including top and bottom walls apertured to have passed therethrough the shaft 82, and a front wall fixed to one side of a rack 89 vertically slidable in a guiding fitment 90 secured to the side plate 30. Said rack is engaged by a spur-gear 91 fixed on a shaft 92 passing through an apertured ear 93 forming part of the fitment 90 and journalled near its forward end in an auxiliary plate 94 having offset top and bottom extensions 94$^a$ and 94$^b$ secured to the side plate 71.

Figure 4A:
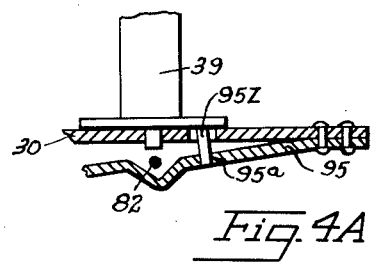
Fig. 4A is a partial enlarged horizontal sectional view taken on the line 4A—4A of Fig. 4.

As shown best in Figs. 3, 4 and 4A, a spring clip 95 is secured to the side plate 30, this clip having a reduced terminal tongue and a shaped portion for passing the shaft 82. A second spring clip 95' is also secured to the side plate 30, this likewise having a reduced terminal tongue and a shaped portion for passing the shaft 82. Through each clip 95 and 95' is a threaded hole, these indicated respectively at 95$^a$ and 95$^b$, each of these holes being in line with an aperture through the side plate 30. Fitted tightly in each of said holes and extended inwardly through the associated one of said apertures is a brake or drag means constituted by a piece of hard felt 95$^z$, see Fig. 4A, which latter are for bearing respectively against the adjacent side of the near end wall of the reel 39 or 40, and with a pressure sufficient to keep the reel from unwinding, as in response to pull from the carrier 38, faster than needed when the other reel is being driven by the motor.

In neutral position, that is, when neither reel is under motor drive, both these brakes are gently pressing against both reels, to keep the same from turning under possible tension of portions of the carrier 38 wound thereon. At the top and bottom, projections from the rack 89, cam or wiper extensions 89$^a$ and 89$^b$ (Fig. 3) are provided. When said rack is elevated, thereby to lift the substantially spherical member 85 for driving the reel 39, the cam 89$^a$ lifts the clip 95 at its said reduced terminal tongue, thereby to free its brake means from said reel; and when said rack is lowered, for positioning said member 85 for driving the reel 40, the cam 89$^b$ lifts the clip 95' at its said reduced terminal tongue, thereby to free its brake means from that reel.

As shown best in Fig. 11, the shaft 92 at its extreme forward end has fixed thereon the blade-carrying member 96 of a blade-and-slot clutch for interlocking with the slot-carrying member 97 of said clutch, with the top cover 37 in place. The member 97 is carried by a short shaft 98, journalled in the vertical wall portion 37$^a$ backing a recess 99 at the front of the top cover 37; there being an expansile coil spring 100 between said wall portion 37$^a$ and a collar 101 secured to the shaft 98, and said shaft beyond said wall portion carrying a hand-knob 102.

For holding the shaft 98 in any desired angular adjustment to which it has been moved by manual turn of the knob 102 with the top cover 37 in place as in Figs. 1 and 2, a detent means (see particularly Fig. 5) is partially carried by the shaft 92, said means comprising a circumferential line of dimples formed up from a spring plate 103 fixed on the plate 94, and a coacting finger 104 offset from a collar 105 fixed on the shaft 92.

It will be noted that more of the dimples are provided than the three positions to which the clutch member 85 is to be shifted, either to drive the reel 39, or to drive the reel 40, or to be disabled relative to both reels; but a further reference to the parts just described will be made when the modification of Figs. 14–16 is below explained.

Reverting to the shutters 60 and 63, these, which are of metal or otherwise opaque, are normally as in Figs. 3 and 11, to give the view panel 35 a maximum effective height, but are simultaneously shiftable to greater mutual adjacency, as shown in Fig. 4, to narrow the height of the view panel. As will be understood, some photographs are elongated vertically, and some horizontally; and in the former case the positives thereof would be printed on the carrier 38 elongated lengthwisely of the carrier, and in the latter case the positives would be printed on the carrier 38 elongated transversely thereof; and the parts associated with the shutters are so arranged that when the shutters are as in Figs. 3 and 11, the height of the view panel is that of a picture on the carrier elongated lengthwisely thereof, and when the shutters are as in Fig. 4, the height of the view panel is that of a picture on the carrier elongated transversely thereof.

The levers 66 and 67 (Figs. 3 and 4) are alike, as are the levers 69 and 70 (Fig. 10); the levers 66 and 69 at their rear ends being fixed on a cross-shaft 110 at the ends of the latter beyond its extension through apertures in the side plates 68 and 71, and the levers 69 and 70 at their rear ends being fixed on a cross-shaft 111 at the ends of the latter beyond its extension through apertures in the side plates 68 and 71. The levers 66 and 67 are normally urged to the positions shown in Fig. 4 by a retractile spring 112 joining said levers, and the levers 69 and 70 are similarly acted on by a spring 114.

For swinging the levers 66 and 67 apart, thus correspondingly and simultaneously to swing apart the levers 69 and 70, means are provided (Figs. 4, 5 and 11) including a pair of upper and lower L-brackets 116 and 117, the former fixed on the lever 66 and the latter fixed on the lever 67. Between these brackets is a substantially elliptical disk 118 mounted on a short shaft 120 journalled in an aperture in the auxiliary plate 94 and fixedly carrying the disk 118, so that as the shaft 120 is turned through 90° in one direction or the other, said disk will become redisposed as shown in Fig. 4 from its position shown in Fig. 11, or vice versa, and will become held with its greater or shorter length extended between the brackets 116 and 117. When the disk 118 is as in Fig. 11, the shutters 61 and 62 are at maximum separation, and when said disk is as in Fig. 4, said shutters are at minimum separation.

The shaft 120 at its extreme forward end has fixed thereon the blade-carrying member 121 of a blade-and-slot clutch for interlocking with the slot carrying member 122 (Fig. 12) of said clutch, with the top cover 37 in place. The member 122 is carried by a short shaft 123, passing, like the short shaft 98, through the wall portion 37$^a$ backing the recess 99 (Fig. 12); there being an expansile spring 124 between the wall portion 37$^a$ and a collar 125 secured to the shaft 123, and said shaft beyond the casing carrying a hand-knob 126.

The shaft 120 (Fig. 6) has secured thereon a hub 130, by means of a set-screw 131, said hub integral with the member 121. One end of spring 132 is fixed as at 133, and its other end said spring is anchored to the hub 130, in a way such that when said shaft is slightly turned in one direction or the other and the spring passes dead-center it snaps to its other position, as the position 132'.

The base 25 at its top and at its four corners has recesses such as those indicated at 135 and 136 in Fig. 3; and the bottom interior of the top cover 37 has blocks fixed therein for fitting into said recesses. Said blocks at the forward end of the top cover have cavities with which interlock the projecting forward ends of clips 137 and 138 secured to the top of the base. With the top cover thus engaged at its forward end, it may be lowered at its rearward end to drop its rear blocks into the recess 136 and the corresponding recess at the other side of the base.

As shown in Figs. 7 and 13, there is a further recess 140 in the top of the base 25 at its rear end, this about halfway across the width of the base. Transverse to said recess is a suitably mounted pin 141. To lock the top cover 37 to the base, a hook 142 is swung to engage the pin 141; the shank of said hook being pivoted on a bolt 143 passing through an aperture in the rear wall of the top cover and secured in place by a nut 144 at the inside of the casing, the head of the bolt being enlarged and roughened as by knurling to constitute a handknob 145.

As indicated at 145' in Figs. 6 and 13, the base 25 may have a surrounding shoulder, of such width as to preclude the bottom portion of the top cover 37 from overhanging the base.

The wiring for the lamp sockets 74 and 75 (Fig. 5), and for the motor 78, these in parallel, terminates in a pair of main wires respectively leading as shown in Fig. 3 to two terminals 157 and 158, these arranged for entry into a switch housing 159 (Fig. 12) on the top cover 37, when the latter is in place on the base 25. The terminals 157 and 158 then respectively engage a pair of terminals in said housing 159, the latter terminals insulated from each other and adapted to be bridged when a toggle-type switch actuator 160 is snapped to circuit-closing position. Two other main wires for connecting the circuit to a source of current are indicated at 161 as passed downward at 162 into an opening leading to a recess at the bottom of the base 25 and so arranged that said wires 161 may extend beyond the rear end of the machine as at 161', for connection to a plug 163 to be inserted into a wall receptacle or the like forming part of a wiring installation for a buildings.

Referring to Figs. 1, 2 and 12, a plate 165 is mounted on the front exterior of the top cover 37 within the recess 99, this plate apertured for the passing therethrough of the shafts 98 and 123 respectively carrying the hand-knobs 162 and 126. These knobs have fixed thereon index fingers 166 and 167.

When the knob 162 is arranged with its index 166 as shown in Fig. 2, pointing toward "O" thereabove on said plate, the clutch member 85 is in inoperative position (as in Figs. 4 and 9) relative to either reel 39 or 40; when said knob is turned to direct its index toward "D," the clutch member 85 is lowered for rotating the lower reel 40, and when the knob is turned to direct its index toward "U," the clutch member 85 is raised as in Fig. 9 for rotating the upper reel 39.

When the knob 126 is arranged with its index 167 as shown in Fig. 2, pointing toward 'H" on the plate 165, the shutters 60 and 63 are at minimum separation as in Fig. 4, and when the knob is turned to direct its index toward "V," the shutters 60 and 63 are at maximum separation as in Fig. 11.

The plate 165 may also carry two markings "F" and two markings "S," the former signifying fast, and the latter slow, these references being to either of two speeds of rotation of the reel 39 and of the reel 40, when such reel is operatively coupled to the motor 78; and provisions for selecting a slow or fast speed of rotation for that one of the two reels at any time desired to be constituted the take-up reel for the carrier 38 are included in the modification now to be described.

Referring now to the modification illustrated in Figs. 14–16, the shaft 182 corresponds to the shaft 82, the worm-gear 181 to the worm-gear 81, the driving member 185 to the member 85, the side plate 130' to the plate 30, the clip 195 to the clip 95, the clip 195' to the clip 95', the reel 139 to the reel 39, the reel 140 to the reel 40, the rack 189 to the rack 89, the guiding fitment 190 to the fitment 90, the spur-gear 191 to the gear 91, and the shaft 192 to the shaft 92.

As indicated at 200 the shaft 182 has a keyway by means of which the member 185 is splined on said shaft. Said member 185 is part of a structure slidable along the shaft but rotatable therewith. Said structure has top and bottom portions, beyond the member 185, and one having an annular groove 201 and the other having an annular groove 202. Engaging these grooves are the forked ends of a U-shaped shifter member 203, such forks shown in Fig. 16. The shifter member 203 at its portion marked 203ª in Fig. 16 is secured to a side of the rack 189, as perhaps best shown in Fig. 15. Along one side of an opening 204 through which, as shown in Fig. 15, the shifter member 203 is extended, said opening has an outbent lip 205 for coacting with the fitment 190 in holding the rack 189 for straight-line up and down movement.

Fixed on the very top of the structure including the clutch member 185 is one member 206 of a ratchet-tooth clutch-coupling the complementary member 207 of which is part of a structure loosely rotative on the shaft 182 and including a bevel pinion 208 meshing with a bevel gear 209 fast on the outer side of the adjacent end flange of the upper reel 139 and arranged coaxially with said reel.

Said structure loose on the shaft 182 is annularly grooved between its bevel pinion 208 and its ratchet-tooth clutch member 207, and in such groove is the marginal portion of a bracket 210 surrounding an opening through the latter; said bracket being twisted at opposite ends to provide an ear 211 for securement to the outer side of the plate 130' and an ear 212 for securement to the inner side of said plate.

Fixed on the very bottom of the structure including the clutch member 185 is one member 214 of a ratchet-tooth clutch-coupling, the complementary member 215 of which is part of a structure loosely rotative on the shaft 182 and including a bevel pinion 216 adapted to mesh with a bevel gear 217 mounted on the lower reel 140 as is the bevel gear 209 on the upper reel 139.

The last-described structure loosely rotative on the shaft 182 is annularly grooved between its bevel pinion and its ratchet-tooth clutch member, and in such groove is the marginal portion of a bracket 218 surrounding an opening through the latter; said bracket being twisted at opposite ends to provide ears corresponding to the ears 211 and 212 of the bracket 210, for securement to the plate 130' as shown.

For coaction with the clutch member 185 the reel 139, at the outer side of its flange carrying its gear 209, is provided with an annular elevation 219 so offset that when said member 185 is moved upwardly to lie alongside said elevation, these two parts will provide, respectively, the driving and driven members of a friction-clutch coupling. Now, the upper reel 139 will be rotated, as the take-up reel, at a relatively slow speed.

For similar coaction with the clutch member 185 the reel 140, at the outer side of its flange carrying its gear 217, is provided with an annular elevation 220 also so offset that when said member 185 is moved downwardly to lie opposite said elevation, these two parts will provide, respectively, the driving and driven members of a friction-clutch coupling. Now, the lower reel 140 will be rotated, as the take-up reel, also at a comparatively slow speed.

In order to rotate the upper reel 139, but at a relatively high speed, the member 185 is given its maximum elevation on the shaft 182, thereby to couple the clutch members 206 and 207; and in order to rotate the lower reel 140, but at a relatively high speed, the member 185 is given its minimum elevation on the shaft 182, thereby to couple the clutch members 214 and 215.

The purpose of the hereinabove referred to two markings "F" and "S" on the plate 165 (Fig. 2) will now be understood. Likewise, the reason why the parts 103 and 104 of Fig. 4 include elements 104 to a total greater, as previously pointed out, than sufficient to provide an impositive detent means relative to three possible positions to which the clutch member 185 may be shifted, will now be understood.

As in the case of Figs. 1–13, the ends of the reels 139 and 140 opposite to the ends thereof seen in Fig. 14 have pivot projections for coaction with the slots 41 and 42 (Fig. 10) and the clips 45 and 46 as previously explained; and, also as in the case of Figs. 1–13, the ends of the reels 139 and 140 seen in Fig. 14 have pivot projections for rotatable engagement with suitable formations in the side wall 130'. Instead of said pivot projections, the reels may be provided with axial bores for extension therethrough of pins or shafts long enough to be connected as already described to the journalling means carried by the side plates 30 and 31. Each of such shafts at the end thereof to be engaged with a clip 45 or 46 (Fig. 10) is recessed for accommodating the dimple of said clip.

In such a construction, when it is desired to remove either reel it is merely necessary, after pulling out slightly on the end of the associated clip 45 or 46 to lift its dimple clear of the recessed end of the reel shaft, to rotate said clip about the stud 220 or 221 by which it is pivotally mounted on the side plate 31. Then, when said shaft is pulled axially a slight distance away from the side wall 31, the reel is free to slide out and off the frame of the machine along the related slot 40 or 41.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A viewing machine for photographic positives, comprising a view panel incorporating a translucent light diffusing element, a source of illumination therebehind, a flexible transparent band form carrier for said positives, said positives having their shadows broken up into a multiplicity of minute and minutely spaced points in the manner characteristic of halftone printing-press work, a pair of reels to the hubs of which are connected the ends of said carrier, means for guiding a length of said carrier for travel between said reels and past said light diffusing element, an electric motor, a rotative element driven by said motor, and means including a single manual actuator for operatively coupling said rotative element to either selected one only of said reels and for disabling said rotative element relative to both reels, the last-named means including a friction clutch the driven member of which is an annular surface at the outer side of an end flange of each reel, said rotative element carrying the driving member of said friction clutch, and said element, comprising a substantially spherical body of a material having frictional and elastically compressible qualities similar to those of ordinary soft rubber, said last-named means also including a device for shifting said body between driving relation to said flanges of one reel, driving relation to said flange of the other reel and non-driving relation to both said reel flanges, said reels having end pivots, and there being journalling means for said pivots and incorporating open-ended downwardly slanting slots so arranged relative to said clutch means that either of said reels may be demounted by removing one of its pivots from an associated one of said slots independent of any take-down of any part of said clutch means.

2. A viewing machine for photographic positives, comprising a view panel incorporating a translucent light diffusing element, a source of illumination therebehind, a flexible transparent band form carrier for said positives, said positives having their shadows broken up into a multiplicity of minute and minutely spaced points in the manner characteristic of half-tone printing-press work, a pair of reels to the hubs of which are connected the ends of said carrier, means for guiding a length of said carrier for travel between said reels and past said light diffusing element, an electric motor, a rotative element driven by said motor, and means including a single manual actuator for operatively coupling said rotative element to either selected one only of said reels and for disabling said rotative element relative to both reels, the last-named means including a friction clutch the driven member of which is an annular surface at the outer side of an end flange of each reel, said rotative element carrying the driving member of said friction clutch, the last-named means including a first positive-lock clutch partially carried by said rotative element and partially carried by one reel and a second positive-lock clutch partially carried by said rotative element and partially carried by the other reel.

3. A viewing machine for photographic positives, comprising a view panel incorporating a translucent light diffusing element, a source of illumination therebehind, a flexible transparent band form carrier for said positives, said positives having their shadows broken up into a multiplicity of minute and minutely spaced points in the manner characteristic of halftone printing-press work, a pair of reels to the hubs of which are connected the ends of said carrier, means for guiding a length of said carrier for travel between said reels and past said light diffusing element, an electric motor, a rotative element driven by said motor, and means including a single manual actuator for operatively coupling said rotative element to either selected one only of said reels and for disabling said rotative element relative to both reels, the last-named means including a friction clutch the driven member of which is an annular surface at the outer side of an end flange of each reel, said rotative element carrying the driving member of said friction clutch, the last-named means including a first positive-lock clutch partially carried by said rotative element and partially carried by one reel and a second positive-lock clutch partially carried by said rotative element and partially carried by the other reel, the last-named means further including an endwisely shiftable device carrying said driving member of said frictional clutch and also carrying the driving member of each of said first and second positive-lock clutches, said device being rotatable for rotating therewith said three driving members, and there being operative connections between said device and said manual actuator whereby the latter in one position thereof shifts said device to disconnect the motor drive from both reels, in another position thereof connects said driving member of said frictional clutch to one of the reels, for rotating that reel at one speed, in another position thereof connects the driving member of one of said positive-lock clutches to the last-named reel, for rotating the same at a higher speed, in another position thereof connects said driving member of said frictional clutch to the other of said reels, for rotating that reel at one speed, and in another position thereof connects the driving member of the other of said positive-lock clutches to the last-named reel, for rotating the same at a higher speed.

4. In a viewing machine having a pair of spaced plates between which superimposed spaced reels having end flanges are rotatively mounted and between which a carrier is to be moved and means independently rotating the reels to be take-up reels for the carrier including a motor driven shaft, a driven member operatively connected to said shaft and adapted to be moved into frictional engagement with either of said reels, a manually operable cam supporting device for moving said driven member, means for retarding free rotation of one of the reels while the other is being rotated and for retarding free rotation of the said other reel while the said one reel is being rotated, said retarding means comprising a flexible clip for each of the reels, said clips being extended horizontally along the outer face of the one plate and extended laterally from the ends of the device for moving said driven member, said clips having their ends remote from the latter device secured to the one plate and having their other ends positioned in the path of movement of the cam supporting device, the one plate being formed with apertures aligned with the flanges of the reels and beneath said clips intermediate the ends thereof, and a brake member mounted on each of said clips intermediate of its ends and projected through said apertures and bearing frictionally against the adjacent flanges of the reels, the movement of said cam supporting device being adapted to cam said brake member out of frictional engagement with the reel.

5. In a viewing machine having a pair of spaced plates between which superimposed spaced reels having end flanges are rotatively mounted and between which a carrier is to be moved and means for independently rotating the reels to be take-up reels for the carrier including a motor driven shaft, a driven member operatively connected to said shaft and adapted to be moved into frictional engagement with either of said reels, a manually operable cam supporting device for moving said driven member, means for retarding free rotation of one of the reels while the other is being rotated and for retarding free rotation of the said other reel while the said one reel is being rotated, said retarding means comprising a flexible clip for each of the reels, said clips being extended horizontally along the outer face of the one plate and extended laterally from the ends of the device for moving said driven member, said clips having their ends remote from the latter device secured to the one plate and having their other ends positioned in the path of movement of the cam supporting device, the one plate being formed with apertures aligned with the flanges of the reels and beneath said clips intermediate the ends thereof, a brake member mounted on each of said clips intermediate of its ends and projected through said apertures and bearing frictionally against the flange of the adjacent reel, and means on said cam supporting device for moving the second-named end of each clip to carry its brake member clear of the flange of the reel to be rotated.

6. In a viewing machine having a pair of spaced plates between which superimposed spaced reels having end flanges are rotatively mounted and between which a carrier is to be moved and means for independently rotating the reels to be take-up reels for the carrier including a motor driven shaft, a driven member operatively connected to said shaft and adapted to be moved into frictional engagement with either of said reels, a manually operable cam supporting device for moving said driven member, means for retarding free rotation of one of the reels while the other is being rotated and for retarding free rotation of the said other reel while the said one reel is being rotated, said retarding means comprising a flexible clip for each of the reels, said clips being extended horizontally along the outer face of the one plate and extended laterally from the ends of the device for moving said driven member, said clips having their ends remote from the latter device secured to the one plate and having their other ends positioned in the path of movement of the cam supporting device, the one plate being formed with apertures aligned with the flanges of the reels and beneath said clips intermediate the ends thereof, a brake member mounted on each of said clips intermediate of its ends and projected through said apertures and bearing frictionally against the flange of the adjacent reel, and cams carried by said cam supporting device and engaged beneath the second-named ends of said clips, so constructed and arranged that as the cam supporting device is moved in one direction the cam on the end of the latter device in the direction in which the latter device is moved will function to flex the respective clip away from the face of the one plate withdrawing the respective brake member freeing the one reel to be rotated.

7. In a viewing machine having a pair of spaced plates between which superimposed spaced reels having end flanges are rotatively mounted and between which a carrier is to be moved and means for independently rotating the reels to be take-up reels for the carrier including a motor driven shaft, a driven member operatively connected to said shaft and adapted to be moved into frictional engagement with either of said reels, a manually operable cam supporting device for moving said driven member, means for retarding free rotation of one of the reels while the other is being rotated and for retarding free rotation of the said other reel while the said one reel is being rotated, said retarding means comprising a flexible clip for each of the reels, said clips being extended horizontally along the outer face of the one plate and extended laterally from the ends of the device for moving said driven member, said clips having their ends remote from the latter device secured to the one plate and having their other ends positioned in the path of movement of the cam supporting device, the one plate being formed with apertures aligned with the flanges of the reels and beneath said clips intermediate the ends thereof, and a brake member mounted on each of said clips intermediate of its ends and projected through said apertures and bearing frictionally against the flange of the adjacent reel, said brake members comprising pieces of hard felt, each of said clips being formed with a hole aligned with the respective aperture, said pieces of felt having one of their ends mounted in the holes of said clips and the other of their ends passing freely through said apertures and bearing frictionally against the adjacent flanges of the reels.

LEANDRO MAZZOCCO.

References Cited in the file of this patent

UNITED STATES PATENTS

| Number | Name | Date |
|---|---|---|
| 697,382 | Maxwell | Apr. 8, 1902 |
| 1,055,441 | Bradshaw | Mar. 11, 1913 |
| 1,572,798 | Hubbard et al. | Feb. 9, 1926 |
| 1,627,468 | Stitt | May 3, 1927 |
| 1,857,633 | Grasmsa | May 10, 1932 |
| 1,863,078 | Woodland | June 14, 1932 |
| 1,886,144 | Zeledon | Nov. 1, 1932 |
| 2,010,042 | Stirling | Aug. 6, 1935 |
| 2,182,559 | Henderson | Dec. 5, 1939 |
| 2,206,865 | David et al. | July 9, 1940 |
| 2,351,371 | Smith | June 13, 1944 |
| 2,355,902 | Berg | Aug. 15, 1944 |